Feb. 12, 1963 W. P. CLINTON ET AL 3,077,405
PROCESS FOR PREPARING AN AROMATIZED
FREE-FLOWING SOLUBLE COFFEE
Filed March 5, 1962
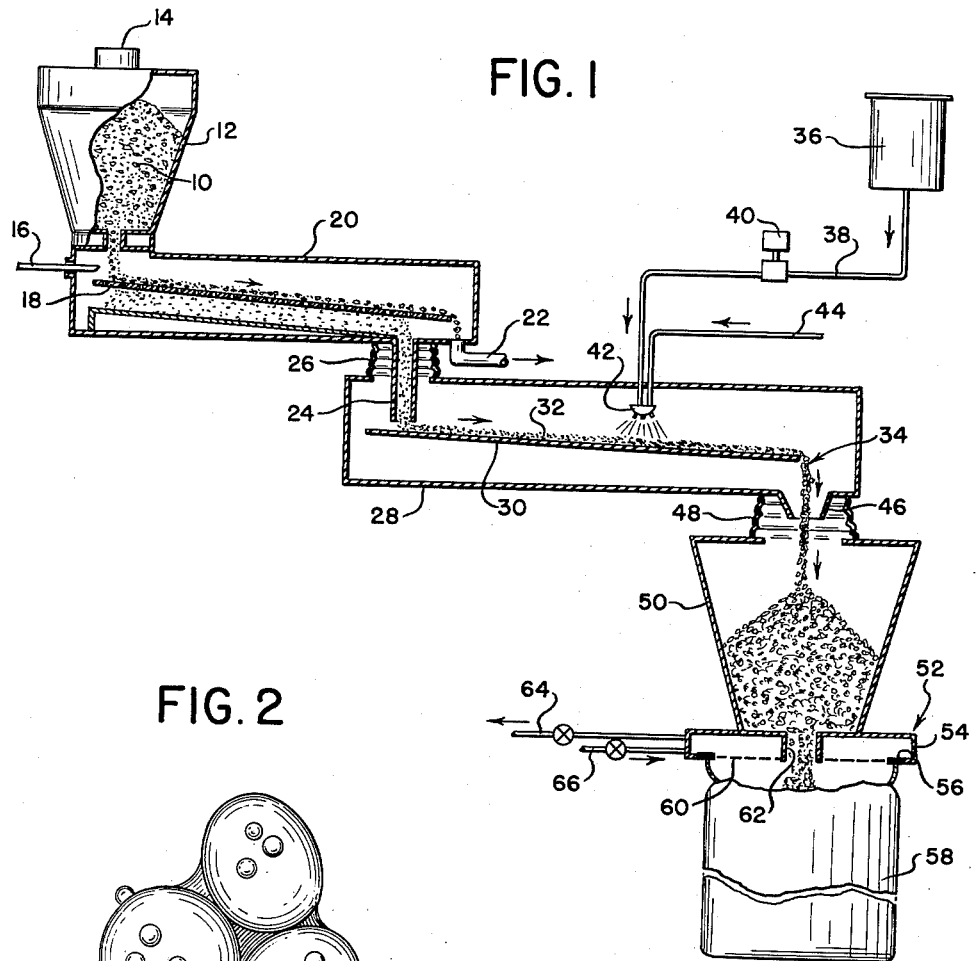
INVENTORS.
William P. Clinton
Esra Pitchon

United States Patent Office 3,077,405
Patented Feb. 12, 1963

3,077,405
PROCESS FOR PREPARING AN AROMATIZED
FREE-FLOWING SOLUBLE COFFEE
William P. Clinton, Morris Plains, N.J., and Esra Pitchon, Flushing, N.Y., assignors to General Foods Corporation, White Plains, N.Y., a corporation of Delaware
Filed Mar. 5, 1962, Ser. No. 179,276
15 Claims. (Cl. 99—71)

This invention relates to aromatized coffee powder. More specifically it relates to the production and packing of an aromatized soluble coffee particularly characterized by its free-flowing characteristics and its low friability.

Although the soluble coffee powders presently produced are eminently satisfactory in most respects, they are uniformly characterized by the absence of the coffee-like aroma which is typically found in freshly brewed coffee. Attempts have been made to aromatize coffee wherein a uniform mixture of an aromatizing principle with coffee has been prepared.

These prior attempts have not heretofore produced a free-flowing oil-aromatized soluble coffee product. Aromatization at the desired level has resulted in an apparent wetness or dampness which renders the coffee tacky and difficult to handle during processing and packaging. Aside from the very real aesthetic deficiencies with resulting consumer non-acceptance of a non-free-flowing coffee powder, it is difficult for the consumer to spoon or pour measured amounts from the container. This undesirable feature of the oil-enriched coffee particles tends to increase on storage, especially at elevated temperatures. Another undesirable aspect has been the substantial impossibility of preparing an aromatized free-flowing coffee which retained its desirable characteristics, particularly its flowability during the handling necessary during processing operations and particularly during packaging.

It is an object of this invention to provide a novel technique for aromatizing a soluble coffee. It is another object of this invention to prepare an aromatized coffee characterized by its spoonability and its free-flowing nature. Still another object of this invention is to prepare such a product which is mechanically strong and mechanically stable and which retains these desirable properties during packing and handling. Other objects will be apparent to those skilled-in-the-art on inspection of the description which follows and of the drawing.

In accordance with certain aspects of this invention, an oil-aromatized, free-flowing, easily spoonable, soluble coffee may be prepared by passing particles of soluble coffee powder through a contact zone, plating onto the surface of said particles droplets of an aromatizing coffee oil, controlling the ratio of the number of coffee oil droplets to coffee particles so that less than all of the coffee particles are wet by the coffee oil, contacting said wetted particles of coffee with other particles of coffee thereby producing agglomerates of coffee particles, continuously admitting soluble coffee to said contact zone, and continuously withdrawing from said zone aromatized, soluble, free-flowing, easily spoonable coffee containing aromatized agglomerates.

The so-prepared coffee may then be passed into a storage zone or hopper which is in air-tight communicating relationship at a lower portion thereof with a container or jar to be filled with the coffee. A pressure differential is created between the storage zone or hopper and the container, the higher pressure being in the storage zone, preferably by lowering the pressure in the container. The coffee under the influence of this pressure differential, flows from the storage zone to the container and thereby diminishes the pressure differential which is reformed again, preferably by again drawing a vacuum on the container, this operation being repeated until the container is filled.

The soluble coffees which may be aromatized in accordance with this invention are those commonly known to those skilled-in-the-art. The term "powder" may be employed generally to describe the coffee which is to be treated by the process of the instant invention as well as the product obtained by this invention. The term "particle" will be employed to designate the structure of the coffee to be treated by the instant invention, which typically is obtained in the form of hollow spheres or globules characterized by discrete, particulate nature, high degree of flowability, ready solubility in hot water, and small particle size—usually of the order of 0.01–0.02 inch. It may be prepared by well-known techniques, typically by extraction of the solubles from ground coffee bean followed by drying of the extract liquor.

The aromatizing coffee oils which may be employed in the practice of this invention may include those prepared from a variety of sources, both natural or artificial, or mixtures thereof. In either case, the oils will contain at least a substantial proportion of those components which are responsible for the aroma and odor of the coffee.

Among the aromas which can be employed in the practice of this invention are those natural aromas which are found at various points in the processing of coffee; those obtained by solvent extraction or expressing of coffee bean may be employed. It is also possible to utilize artificial aromas. One preferred aromatizing material may be raw expressed coffee oil containing an aroma concentrate. Under preferred conditions, the aromatizing oil will be prepared, e.g. as by expressing, in an inert atmosphere of carbon dioxide or nitrogen and will be maintained and stored under mild to low temperature conditions.

Just prior to the time when the aromatizing oil is to be used in accordance with this invention, it will preferably be heated to above the congeal temperature range of the oil. Typically, the congeal range of the oils employed may be 48° F.–55° F. The oils are usually warmed to about 5° F.–15° F. above their congeal range, preferably to at least about 60° F., and within the range of 60° F.–70° F.

It is preferred that the fine particles of coffee powder which are to be aromatized and agglomerated in accordance with this invention, be maintained as a moving bed within the contact zone wherein aromatization occurs whereby the particles in the bed will be gently agitated with respect to one another and thus be agglomerated on contact with other particles to an extent sufficient to permit formation of the agglomerates but not sufficiently vigorously to break up the agglomerates. Moving beds useful in connection with the invention include those formed on a moving belt, a vibrating table or an inclined surface; these beds may move horizontally, vertically, or on an incline in any direction upwardly or downwardly. Such a bed may typically be of 0.5–1.5 inch thickness whereunder the preferred conditions the coffee particles are moved horizontally across the contact zone by a vibrating surface.

As the particles pass through the contact zone, the aromatizing coffee oil is sprayed onto the surface of the particles, in the form of a coarse spray, typically having a droplet size of about 0.003 inch to about 0.10 inch, and preferably 0.01–0.03 inch diameter. It is a particular feature of this embodiment of the invention that use of coarse oil particles, as herein noted, permits attainment of a superior product not possible with a fine particle spray. If a fine spray be used, i.e. one wherein the particle size is substantially less than about 0.001 inch, the product is characterized by undesirably poor flowability. If the particle size of the oil spray is substantially greater than the preferred range, e.g. 0.10 inch or larger, the product is undesirably non-uniform in size. The preferred droplet size may be produced for example by spraying oil at a rate of 5-75 grams per minute per orifice through an orifice having a size of 0.016 to 0.60 inch in the presence of an atomizing gas, e.g. carbon dioxide.

The plating of aromatizing coffee oil droplets onto the coffee particles is controlled so that less than all of the coffee particles are wet by the coffee oil. Under preferred conditions wherein the coffee contains about 5% to 25% on 40 mesh, 50% to 85% on 80 mesh and 5% to 30% through 80 mesh particle size distribution with a median particle size about 50 mesh, i.e. 0.01-0.02 inch, and the oil droplets have a size about 0.01-0.03 inch diameter, the amount of oil employed will be 0.01% to 3.0%, preferably 0.2%-0.5% by weight of the coffee. Although the ratio of the number of oil droplets to the number of coffee particles passing the point of application of the oil may vary, this number will be less than one—i.e. less than all the coffee particles will be wet by the oil. Typically, for example, the ratio may be 1:1500.

It is a particular feature of this invention that the unexpected properties of the product are obtained when the aromatizing oil is plated onto the coffee particles in micro-heterogeneous distribution. Microscopic inspection of the coffee immediately after the oil has been added, reveals a plurality of spaced points of high oil concentration surrounded by a much greater portion of coffee which is substantially free of oil. For example, when the oil is sprayed in a droplet size equal to that of the coffee particles, it may be found that each droplet of oil is centered in volume of coffee particles and that this volume may statistically be as large as a sphere having a radius of 5-10 coffee particles. Although this micro-heterogeneous structure is apparent, the entire body of coffee contains many such volumes and accordingly the entire body may be said to be macro-homogeneous, this latter term also referring to the visual appearance of the entire mass. The description of the soluble coffee as both micro-heterogeneous and macro-homogeneous also accurately describes the coffee after the agglomerates have been formed. The gross appearance of the coffee is homogeneous while on microscopic inspection of the preferred embodiment, it is seen that the agglomerates are within a mass of coffee particles in a micro-heterogeneous array.

It is found that the preferred micro-heterogeneous, macro-homogeneous distribution is most readily obtained when the oil droplets are of a coarse size, i.e. at least as large as the size of the coffee particles.

As the oil is plated onto the surface of the moving bed, those particles which are wetted are contacted with other particles with the result that discrete agglomerates are formed. As the agglomerates pass through the contact zone, they gradually build up to a gross size which may be as large as 8 mesh, i.e. 0.1 inch, but more typically about 10-12 mesh, i.e. 0.06 inch.

The use of the preferred gently moving beds, rather than violently agitated beds, of coffee particles permits attainment of the macro-homogeneous, micro-heterogeneous coffee product wherein the agglomerates are present in proper amount and size and their break-up is minimized.

It is a feature of this invention that the agglomerates so prepared comprise a plurality of small coffee particles bound together by aromatizing coffee oil into an aggregate or cluster characterized by its superficial dryness, its highly aromatic nature, and its superior mechanical stability. In the clusters, a small number of adhering larger coffee particles is more-or-less completely enveloped by a larger number of somewhat smaller particles, the entire mass being held together by the surface tension of the binding oil and the capillary attraction thereof for the particles, these binding forces being exerted primarily at the points of contact of the particles.

The free-flowing, aromatized bed of soluble coffee particles, when prepared according to the preferred technique, will contain an essentially continuous body, phase, or portion of the charge coffee powder of about 50 mesh median-size, i.e. 0.01-0.02 inch size and distributed therein a plurality of the above-noted flavor-containing agglomerates or clusters. Typically the discontinuous agglomerate phase of the mass will contain less than about 10% by volume of the total coffee and more commonly from 5% to 10% thereof; thus preferably the product will comprise a major proportion by volume of particles of about 50 mesh median-size and a minor proportion by volume of agglomerates of average size greater than about 50 mesh, the latter being preferably about 10-12 mesh and sometimes as large as 8 mesh average size.

It is preferred to store, to handle, and otherwise to process both the aroma-bearing oil and the coffee containing the clusters or agglomerates in an inert gaseous, i.e. oxygen-free environment, this being preferably accomplished by use of carbon dioxide or nitrogen.

It is a particular feature of this invention that soluble coffee powder containing the agglomerates or clusters prepared in accordance with this invention are characterized by a high degree of mechanical stability so that when packed into containers by the preferred technique, they retain their desirable characteristics. The preferred packing technique is conducted by maintaining a container in air-tight relationship with a preferably elevated and superimposed hopper of coffee containing the agglomerates, creating a lower pressure in the container than in the hopper preferably by drawing a vacuum in the container whereby coffee particles pass into the container under the influence of the pressure differential, the differential decreasing as the particles flow, preferably flushing the container with an inert gas when the differential pressure has reached a low point, and repeating the differential pressure production and flushing operations until the container is filled. In the preferred filling operation, the pressure differential will be created by forming a vacuum in the container, the pressure differential between the hopper and the container being 5-22 inches of mercury. During the total filling time of 4-5 seconds per jar, the vacuum may be re-drawn 3 or 4 times.

In the product produced in accordance with this invention the agglomerates are mechanically stable to the extent that they do not appreciably rupture or lose aroma content during the vigorous handling which occurs during filling of the containers.

In accordance with a specific embodiment of this invention as set forth in FIGURE 1 of the drawing, powdered soluble coffee 10 is admitted to storage hopper 12 through opening 14. Purging of oxygen from coffee 10 may be effected by introducing an inert gas such as carbon dioxide to the lower extremity of preferably frustoconical hopper 12 through an appropriate entry, not shown. In similar manner, the entire process may preferably be conducted in oxygen-free environment by admission of inert gas such as carbon dioxide in appropriate places.

The oxygen-free coffee particles are discharged from the bottom of hopper 12 through valve 16 and passed onto a vibrating classifier 18 in chamber 20. Oxygen-free conditions may be maintained therein by introduction of inert gas such as carbon dioxide. Coffee particles are classified in chamber 20 so that large particles remain on the screen 18 and are removed through outlet 22.

Coffee particles of preferred size of about 50 mesh, i.e. 0.01-0.02 inch, pass through screen 18 and are withdrawn from chamber 20 through outlet 24. The particles are admitted to contact zone 28 and are disposed on surface 30 in the form of a bed 32 having a depth of about one inch. The surface 30 is vibrated, by a device not shown, so that the bed 32 moves across the surface from the inlet end thereof to the discharge end 34. The contact zone 28 may be maintained oxygen-free by admission of inert gas such as carbon dioxide. Temperature of the coffee particles admitted to the contact zone 28 may be ambient temperature, typically 80° F.

The aromatized coffee oil for use in this embodiment was an expressed coffee oil. This aromatizing oil is removed from coffee oil reservoir 36 through line 38 by pump 40.

The aromatizing oil in line 38, at a temperature of 65° F., is passed to spray nozzle 42 which in this embodiment has holes which are 0.028 inch in diameter. Also admitted to nozzle 42, through line 44, is a stream of inert atomizing gas, typically carbon dioxide, at about 0.3 p.s.i.g. to effect atomization of the oil. The spray which leaves the nozzles is in the form of coarse particles of size ranging from about 0.003 inch to 0.10 inch with a median particle size of 0.01–0.03 inch. The rate of spraying is maintained so that the amount of oil is about 0.25% by weight of the amount of the coffee particles. As the fine particles of coffee pass through the contact zone, the coarse droplets of aromatizing oil fall on the upper surface of the coffee. Because of the controlled liquid to solid ratio, less than all of the particles are wet by the oil. In this embodiment, the ratio of oil droplets to coffee particles appeared to be about 1:1500.

As the bed moves across contact zone 28, the wetted particles of coffee powder are agitated and they contact other particles of coffee powder in the bed. The particles agglomerate or form clusters, the surface tension and capillary action of the oil providing the binding force which holds the agglomerate together. A typical agglomerate leaving the discharge end 34 of contact zone 28 comprises a plurality (usually 2–5) of small coffee particles of about 50 mesh size bound together by the aromatizing oil, and a larger number of somewhat smaller particles adhering to the outer portions of the cluster.

As will be apparent to those skilled-in-the-art, the agglomerates prepared in this process will vary depending upon the precise conditions of agglomeration. The agglomerates will not of course all be identical even when prepared under the same conditions. FIGURE 2 shows an agglomerate which may be considered as illustrative of those which are formed. As is apparent, some half-dozen more or less uniformly sized coffee particles are bound together. Each of these large particles touches at least one other comparable particle at a point of a high concentration of coffee oil, and very little, if any, coffee oil appears to be found on the agglomerate at points other than points of contact of coffee particles. This particular agglomerate also has bound to it on the outer surface of each of the larger particles several small finer particles which appear to be of the order of 80 mesh or even smaller.

The soluble coffee powder leaving zone 28 contains about 7% by volume agglomerates of size greater than about 50 mesh, mostly about 10–12 mesh, and about 93% by volume of a continuous portion of coffee particles of about 50 mesh size.

The superficially dry-free-flowing coffee product is removed from contact zone 28 through draw-off 46 which passes through bellows 48 which, similarly to bellows 26, isolates the vibrating contact zone 28. The product passes through draw-off 46 into storage hopper 50, to which inert gas such as carbon dioxide may be admitted. The use of a carbon dioxide atmosphere at this point, as well as at other points throughout the system, aids in reducing the loss of fugitive aromatic components in the coffee oil and in minimizing the development of aroma-staling precursors in the coffee oil or in the agglomerated product.

Packing of the free-flowing aromatized coffee is preferably effected by means of a filling head generally designated 52 including a housing 54 bearing on its lower surface a gasket 56 of diameter sufficient to accommodate a standard coffee container or jar 58. The housing 56 also has a perforated screen-like area 60 on its lower surface within the confines of the gasket 56. A centrally located filling spout 62 permits communication between storage hopper 50 and container 58. Housing 54 bears conduits 64 and 66.

The aromatized, free-flowing coffee containing the mechanically stable agglomerate in hopper 50 may be passed through filling spout 62 into container 58 by drawing a vacuum in container 58 through conduit 64. As the vacuum of e.g. 22 in. Hg is drawn, the coffee in hopper 50 passes through spout 62 under the pressure differential decreasing as the material flows. Thereafter inert gas such as carbon dioxide is admitted through line 66 to provide an oxygen-free space within container 58, and to remove from screen 60 any material which has accumulated thereon. This sequence of operations is repeated, typically for 3–4 times over, e.g., 4–5 seconds, until the container 58 is filled with coffee.

It is a particular feature of this invention that the free-flowing product containing the agglomerates remains physically unaltered during the operations subsequent to the agglomerate formation. The soluble coffee in the container is characterized by its highly aromatic nature, high mechanical stability, superficial dryness, and free-flowing character. These features are maintained during extended storage life at temperatures as high as 110° F. On opening the container, the aroma is readily apparent and this pleasant feature gives to the consumer a true indication of the flavor of the beverage which may be prepared from the powder. It is particularly significant that the aromatized coffee powder, as a result of this invention, can now be easily spooned or otherwise removed from the container; the housewife can thereby remove uniform spoonfuls of aromatized soluble coffee from the container which would not be so if the coffee were non-free flowing and caked as is typically the case with aromatized coffee prepared by other processes.

The high degree of spoonability and the free-flowing nature of the coffee product is readily apparent to the consumer. The coffee can easily be removed from the container; it has not packed tightly; spoonfuls removed therefrom contain a uniform amount of a superficially homogeneous and dry coffee. The coffee can easily be poured from the container. In contrast, coffee prepared by other processes imparting the same aroma level are wet, pack tightly into the container, are not readily or easily spoonable or pourable, and are generally unsatisfactory in appearance.

Although this invention has been described in connection with a single embodiment, it will be apparent to those skilled-in-the-art that various modifications may be made thereto which fall within the scope of the claims. For example, it is possible to plate the oil onto a moving bed of particles on a moving belt whereon the particles are essentially fixed with respect to each other and then to contact the wetted particles of coffee with other particles by gentle agitation. Other embodiments of this invention will be apparent to those skilled-in-the-art.

This application is a continuation-in-part of our earlier filed patent application Serial No. 739,242, filed June 2, 1958.

What is claimed is:

1. The process for preparing an aromatized, free-flowing soluble coffee which comprises passing particles of soluble coffee through a moving contact zone, plating onto the surface of said particles in said contact zone droplets of an aromatizing coffee oil, controlling the ratio of coffee oil droplets to coffee particles so that less than all of the coffee particles are wet by the coffee oil, continually contacting said wetted particles of coffee with other particles of coffee thereby producing agglomerates of coffee particles, continually introducing soluble coffee particles to said contact zone to continue the production of said agglomerates in said zone, and create micro-heterogeneous distribution of said agglomerates after they have been contacted by said oil, and withdrawing from said zone aromatized mechanically stable, free-flowing soluble coffee containing aromatized agglomerates, the agglomerate phase of the mixture constituting a minor portion of the volume of the total coffee product.

2. The process of claim 1 wherein the droplets of aromatizing oil are coarse droplets.

3. The process of claim 1 wherein the soluble coffee being aromatized contains about 5% to 25% on 40 mesh, 50% to 85% on 80 mesh, and 5% to 30% through 80 mesh particle size distribution with a median particle size of about 50 mesh.

4. The process of claim 1 wherein the droplets of aromatizing oil have a particle size substantially in the range of 0.003–0.10 inch.

5. The process of claim 1 wherein the amount of oil plated onto the coffee is 0.01%–3.0% by weight of the coffee whereby less than all of the coffee particles are wet by the aromatizing coffee oil.

6. The process of claim 1 wherein the aromatizing coffee oil is at a temperature above its congeal range.

7. The process of claim 1 wherein the coffee oil comprises expressed coffee oil.

8. The process of claim 1 wherein the coffee oil comprises an expressed coffee oil and an aroma concentrate.

9. The process of claim 1 wherein the plating is conducted in an inert atmosphere selected from the group consisting of carbon dioxide and nitrogen.

10. The process of claim 1 wherein the plating is effected by atomizing the oil in a stream of inert atomizing gas.

11. The process for preparing an aromatized, free-flowing soluble coffee powder which comprises maintaining a moving bed of fine particles of soluble coffee within a moving contact zone, spraying onto the surface of said moving bed of particles droplets of an aromatizing coffee oil, controlling the ratio of coffee oil droplets to coffee particles so that less than all of the coffee particles are wet by the coffee oil, contacting said wetted particles of coffee with other particles of coffee in said bed, thereby producing agglomerates of coffee particles, continuously adding soluble coffee to said moving bed, and continuously withdrawing from said bed of powdered soluble coffee containing aromatized mechanically stable, free-flowing, soluble coffee powder agglomerates.

12. The process of claim 11 wherein the amount of oil sprayed onto the coffee is 0.1%–3.0% by weight of the coffee thereby producing a soluble coffee less than about 10% by weight of which is in the form of agglomerates larger than about 50 mesh and at least about 90% by weight thereof is in the form of particles of about 50 mesh median size.

13. The process for preparing an aromatized, free-flowing, soluble coffee which comprises passing particles of soluble coffee through a moving contact zone, spraying onto the surface of said particles droplets of an aromatizing coffee oil, controlling the ratio of coffee oil droplets to coffee particles so that less than all of the coffee particles are wet by the coffee oil, contacting said wetted particles of coffee with other particles of coffee thereby producing agglomerates of coffee particles, introducing soluble coffee to said moving contact zone, passing said withdrawn agglomerates to a gas-tight storage zone, maintaining a container below said storage zone and in communication therewith, forming a lower pressure in said container than in said storage zone whereby particles pass under the influence of the pressure differential from said storage zone to said container thereby diminishing said pressure differential, and intermittently reforming said pressure differential until said container is filled with said product.

14. In the process of preparing a filled container of free-flowing, powdered, soluble coffee containing aromatized mechanically stable agglomerates of soluble coffee particles wherein coffee is obtained in the form of a body to be packaged in a container which is in air-tight communicating relationship with the lower portion of said body, the improvement which comprises forming a lower pressure in said container than is above the body of said powder whereby coffee passes under the influence of the pressure differential from said body to said container thereby diminishing the said pressure differential, and intermittently reforming said pressure differential until said container is filled with said coffee.

15. The process for preparing an aromatized, free-flowing soluble coffee which comprises passing particles of soluble coffee through a moving contact zone, plating onto the surface of said particles in said contact zone droplets of an aromatizing coffee oil, controlling the ratio of coffee oil droplets to coffee particles so that less than all of the coffee particles are wet by the coffee oil, continually contacting said wetted particles of coffee with other particles of coffee thereby producing agglomerates of coffee particles, continually introducing soluble coffee particles to said contact zone to continue the production of said agglomerates in said zone, and create micro-heterogeneous distribution of said agglomerates after they have been contacted by said oil, and withdrawing from said zone aromatized mechanically stable, free-flowing soluble coffee containing aromatized agglomerates, the agglomerate phase of the mixture being less than about 10% of the volume of the total coffee product, passing said withdrawn mixture containing agglomerates to a gas-tight storage zone maintaining a container below said storage zone and in communication therewith, forming a lower pressure in said container than in said storage zone whereby particles pass under the influence of the pressure differential from said storage zone to said container thereby diminishing said pressure differential, and intermittently reforming said pressure differential until said container is filled with said product.

References Cited in the file of this patent

UNITED STATES PATENTS

| | | |
|---|---|---|
| 1,271,761 | Phillips | July 9, 1918 |
| 1,605,115 | Kellogg | Nov. 2, 1926 |
| 2,335,192 | Moore | Nov. 23, 1943 |
| 2,350,903 | Kellogg | June 6, 1944 |
| 2,408,260 | Kellogg | Sept. 24, 1946 |
| 2,695,238 | Ferguson | Nov. 23, 1954 |
| 2,696,443 | Allbright | Dec. 7, 1954 |
| 2,713,543 | Peters | July 19, 1955 |
| 2,897,084 | Peebles | July 28, 1959 |

UNITED STATES PATENT OFFICE
CERTIFICATE OF CORRECTION

Patent No. 3,077,405                         February 12, 1963

William P. Clinton et al.

It is hereby certified that error appears in the above numbered patent requiring correction and that the said Letters Patent should read as corrected below.

Column 6, line 15, after "differential" insert -- existing across the spout, the differential --; line 60, for "patricles" read -- particles --.

Signed and sealed this 10th day of September 1963.

(SEAL)
Attest:

ERNEST W. SWIDER                         DAVID L. LADD
Attesting Officer                           Commissioner of Patents